United States Patent [19]
Gretz et al.

[11] Patent Number: 5,410,104
[45] Date of Patent: Apr. 25, 1995

[54] LOW PROFILE STRAIN RELIEF CORD GRIP FITTING

[75] Inventors: Thomas J. Gretz, Clarks Summit; Daniel J. O'Neil, Moscow, both of Pa.

[73] Assignee: Arlington Industries Inc., Scranton, Pa.

[21] Appl. No.: 55,857

[22] Filed: Apr. 30, 1993

[51] Int. Cl.⁶ .......................................... H02G 15/00
[52] U.S. Cl. ............................ 174/65 SS; 248/56
[58] Field of Search ............ 174/65 SS, 65 G, 152 G, 174/153 G; 248/56; 439/606, 460, 461; 277/198

[56] References Cited

U.S. PATENT DOCUMENTS

| | | | |
|---|---|---|---|
| 3,649,054 | 3/1972 | McClenan | 285/158 |
| 4,505,006 | 3/1985 | Andre | 248/56 X |
| 4,525,000 | 6/1985 | Bachle | 174/65 SS X |
| 4,738,636 | 4/1988 | Bolante | 439/462 |
| 4,739,126 | 4/1988 | Gutter et al. | 174/65 SS |
| 4,789,759 | 12/1988 | Jones | 174/65 SS |
| 5,280,138 | 1/1994 | Preston et al. | 174/152 G |

Primary Examiner—Leo P. Picard
Assistant Examiner—Paramita Ghosh

[57] ABSTRACT

A low profile strain relief cord grip is disclosed. The cord grip may be used in applications where a large number of conductors require their ganging in close proximity to one another in a panel or junction box. This cord grip provides strain relief on the cable, holding the cable from pulling out of the panel or from putting any strain on the terminal connections within. The cord grip is designed to be easily constructed and mass produced and does not require the use of complex dies as do some of the popular cord grips in common use in the industry today. The cord grip provides a liquid-tight seal, allowing its use indoors or outdoors. A wide range of cable sizes may be utilized with one size of cord grip. It utilizes a compressible one-piece grommet having an inner sleeve with lips in contact with the cable and an outer array of wedges that mate with a compression cone for compressing the grommet's periphery in an inward direction to tightly grip the cable in a water tight manner.

5 Claims, 3 Drawing Sheets

LOW PROFILE STRAIN RELIEF CORD GRIP FITTING

FIELD OF THE INVENTION

This invention relates to strain relief electrical connectors, and specifically to strain relief connectors that are of low profile, allowing the ganging of several cables in close proximity to each other at their juncture into an electrical junction box or panel.

BACKGROUND OF THE INVENTION

The most popular types of low profile strain relief cord grips on the market today commonly consist of several pieces that are molded of plastic. A locking nut portion is typically tightened once the cable is inserted within the separate pieces of the connector and the tightening action causes several fingers to close upon the inserted cable and grip it in place.

U.S. Pat. No. 3,991,446 describes a one-piece knock-out plug that can be applied to a wide range of knockouts in a junction box, but makes no mention of a wide range of cable sizes. U.S. Pat. No. 3,991,446 is very limited on the size of cable that may be used in conjunction with it. There is no mention of the tightness of grip on the cable or the liquid-tightness of the grip. The bushing of U.S. Pat. No. 3,516,111 is substantially different from the disclosure of this invention, with a thermoplastic connector containing fingers that exert force on an inserted cable. As mentioned in the patent, the bushing will "tend to hold such element against counter movement from the direction of insertion without precluding counter movement". The bushing of U.S. Pat. No. 3,516,111 therefore does not provide strain relief as does the cord grip of this invention.

U.S. Pat. No. 3,788,655 relates to a one-piece grommet that can be used for sealing a cylindrical object in an aperture of a panel. This grommet is strictly limited in the range of size of cylindrical object that may be inserted within it. Also, no mention is made of the strain relief capabilities of the grommet.

The anti-rattle bushing mentioned in U.S. Pat. No. 3,768,115 is intended to prevent metal to metal contact between a lever arm and an actuator rod and as such does not relate closely to strain relief cord grips.

U.S. Pat. No. 3,506,999 mentions two symmetrical plastic pieces that form a grommet that is intended to form a seal around a control cable. A given size grommet is applicable to one size cable only and no mention is made of strain relief capabilities.

A grommet that is particularly adopted for deployment around the push-pull knob of an automobile lock is disclosed in U.S. Pat. No. 3,351,974. It is substantially different than a strain relief cord grip as the grommet is not designed to tighten upon the inserted door lock.

A self-locking insulating sleeve, designed to be pushed into the aperture of a panel, is mentioned in U.S. Pat. No. 3,197,556. No mention is made of the sleeve's capability to accept a wide range of cable sizes. The sleeve has limited strain relief capabilities as the invention mentions the ability of an operator to "exert a force that is sufficient to cause withdrawal" of the sleeve from the opening in the wall structure.

This disclosure thus improves upon all of the aforementioned prior art by providing a cord grip that:

1) is of a simple construction and can be easily and cheaply mass produced,
2) is of a low profile to allow ganging of cables in close proximity to one another,
3) provides a firm yet non-abrasive grip or bite on the cable,
4) forms a liquid-tight seal around the cable, and
5) accepts a wide range of cable sizes.

The novel features of this invention are described in detail in the following sections and in particular in the appended claims.

OBJECTS AND ADVANTAGES

One object of this invention is to provide a low profile strain relief cord grip that is easy to manufacture. Many of the commercially available cord grips on the market today are of a complicated design, requiring the use of a complicated and expensive die construction to mold the components of the cord grip. A second object of this invention is to provide a cord grip that is of low profiler allowing the connection several cables in close proximity to one another at a junction box or panel.

A third object of this invention is to allow the connection of a wide range of cable sizes to a junction box or panel with a single size cord grip.

A fourth object of this invention is to provide a cord grip that applies a positive grip on the cable once inserted into the junction box and tightened in place, preventing any outside tension applied to said cable from putting tension upon the terminal connections within the box.

Another object of this invention is to provide a cord grip that provides a liquid-tight seal around the cable at its juncture with the electrical box or panel, preventing liquid contamination such as water or oil from entering the enclosure.

DESCRIPTION OF THE INVENTION

The figures are intended to illustrate a preferred embodiment of this invention, a low profile strain relief cord grip fitting.

Figure 2:
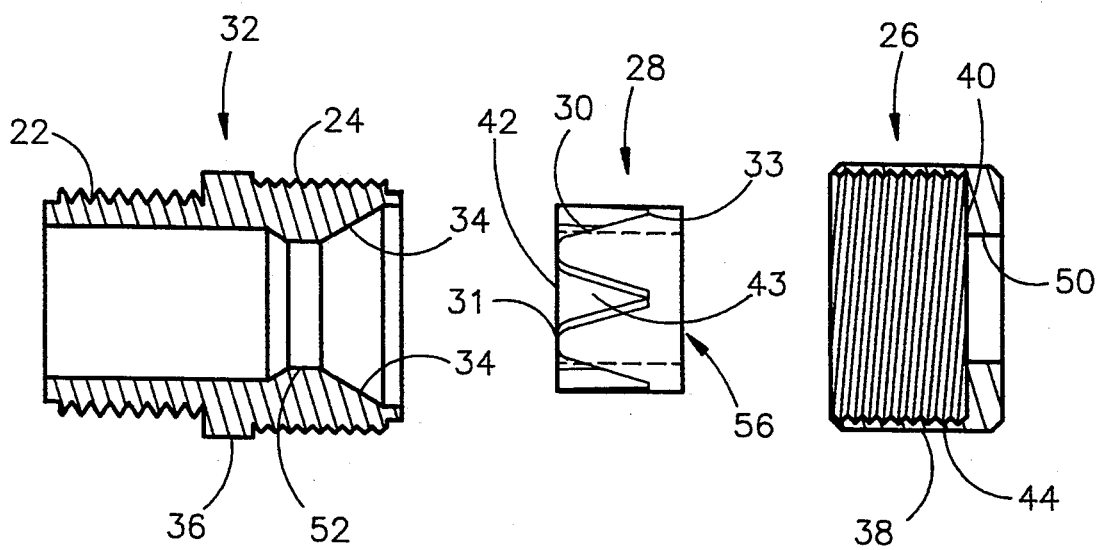
FIG. 2 is a side view of a cross-section of the connector plus a non cross-sectional view of the grommet plus a cross-section of the compression nut.

FIG. 2 depicts a side view of the three separate items that comprise the invention, including a cross-section view of the connector 32, a cross-section view of the compression nut 26, and a non-sectioned view of the grommet 28.

In FIG. 2, the connector 32 is depicted with lock nut threads 22 machined along its outside diameter on the narrow or inboard end. In operation, the connector 32 is affixed to the wall of a junction box or and electrical panel by a lock nut that mates with the lock nut threads 22. A sealing gasket may also be used between the connector and the panel. Adjacent to the lock nut threads 22 is the raised hex surface that is provided for gripping the connector with a wrench or similar tool for tightening the lock nut to the connector and junction box wall.

The opposite or outboard end of connector 32 contains on its outer cylindrical surface the compression threads 24 that are provided for attaching the compression nut 26. The connector 32 has an inner cylindrical surface or aperture 52 that will allow passage of an electrical cable. The open end of the connector 32 at its outboard end will accept the grommet 28 and is depicted with an inner conical surface 34 that diverges outwardly in the direction of the outboard end.

The grommet 28 is shown with wedge-shaped ribs 30 that are raised typically 0.0735 inches above the outer surface of the compressible lip 42 which is part of an integral sleeve 43. The inner cylindrical surface or opening 48 of the sleeve 43 of grommet 28 is sized to accomodate the electrical cable, typically 0.0490 inches in this particular size application, and is approximately the same diameter as the aperture 52.

A compression nut 26 is depicted to the right of the grommet 28 in FIG. 2 with the cross-sectional cutout showing the interior thread 44 that will mate with the external compression thread 24 on the connector 32. The outer surface 38 of the compression nut 26 is shown. The smooth seat 40 will, when mated with the connector 32 and tightened, contact the grommet 28 at base surface 56. The base 56 is a flat plane and is made up of the outboard end of inner sleeve 43 and the base of the generally triangular shaped ribs 30. The triangular ribs 30 have an apex 31 and terminate at their base 33 where they join an adjacent rib 30. The ribs do not extend outboard the full length of the grommet so that their base is a cylindrical volume integral with the inner sleeve at the outboard end. The apexes of the six generally triangular wedge shaped ribs 30 first contact the inclined conical surface 34 and are forced inward to cause the compressible lips 42 of the inner sleeve to compress tightly about the cable as the compression nut 26 is tightened. As the compression nut 26 is tightened the apexes of the ribs 30 are forced closer to one another both side to side and into a smaller diameter so that they function as a collet that carries the integral compressible lip with them.

It is to be appreciated that the inner cone can be placed on the compression nut 26 with the grommet 28 reversed so that the apexes of the ribs face outboard rather than inboard. The ribs could also face both inboard and outboard with inner cones on both the connector and compression nut 26. During compression the space between the ribs permit them to close on one another and offer a space for the grommet material to partially move into.

The end of compression nut 26 has inner cylindrical surface or aperture 50 to accomodate passage of the cable. Aperture 50 is approximately the same diameter as opening 48 and aperture 52.

Figure 3:
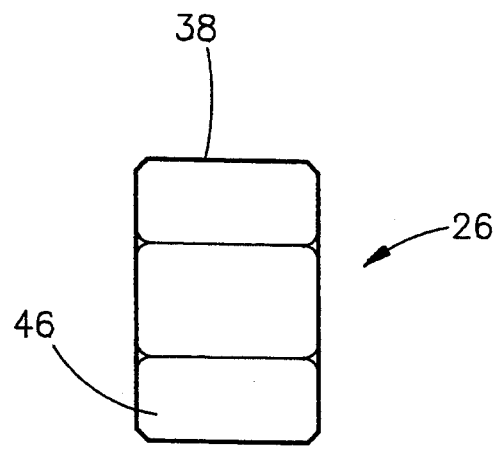
FIG. 3 is a side view of the compression nut.

The side view of the compression nut 26 in FIG. 3 depicts the chamfered edge or flats 46 on the outer surface 38 of the nut. The chamfered edges or flats 46 provide a surface for a wrench of similar tool to grip the compression nut 26 when fastening it to the connector.

Figure 4:
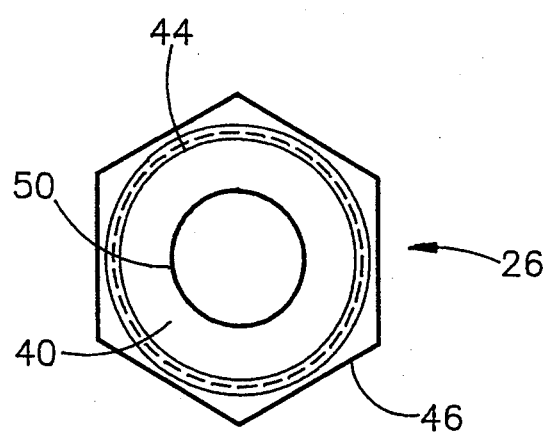
FIG. 4 is an end view of the compression nut.

An end view of the compression nut 26 in FIG. 4 depicts the smooth seat 40, the eight chamfered edges or flats 46, the inner cylindrical surface 50, and the interior thread 44.

Figure 5:
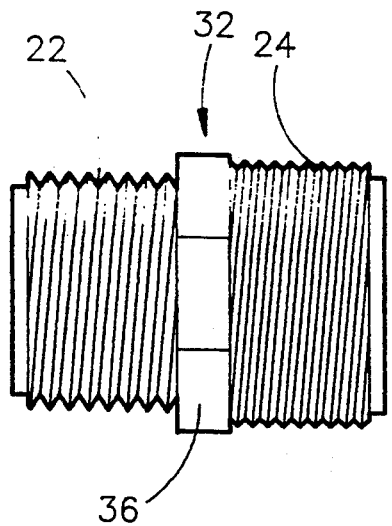
FIG. 5 is a side view of the connector.

A side view of connector 32 in FIG. 5 depicts the raised hex surface 36, the lock nut thread 22, and the compression thread 24.

Figure 6:
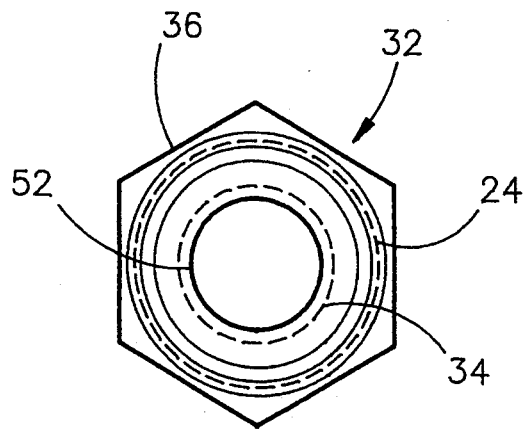
FIG. 6 is an end view of the connector.

An end view of the connector 32 in FIG. 6 depicts the raised hex surface 36, the inner cylindrical surface 52, the inner conical surface 34, and the compression thread 24.

Figure 7:
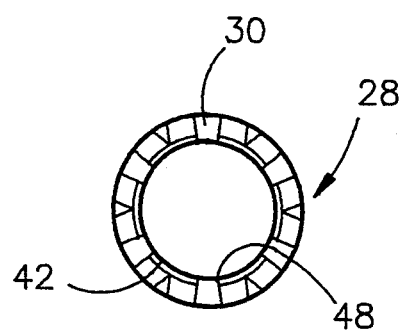
FIG. 7 is an end view of the grommet.

FIG. 7 depicts details of the grommet 28, including the wedge-shaped ribs 30, the compressible lip 42, and the inner cylindrical surface 48.

Figure 1:
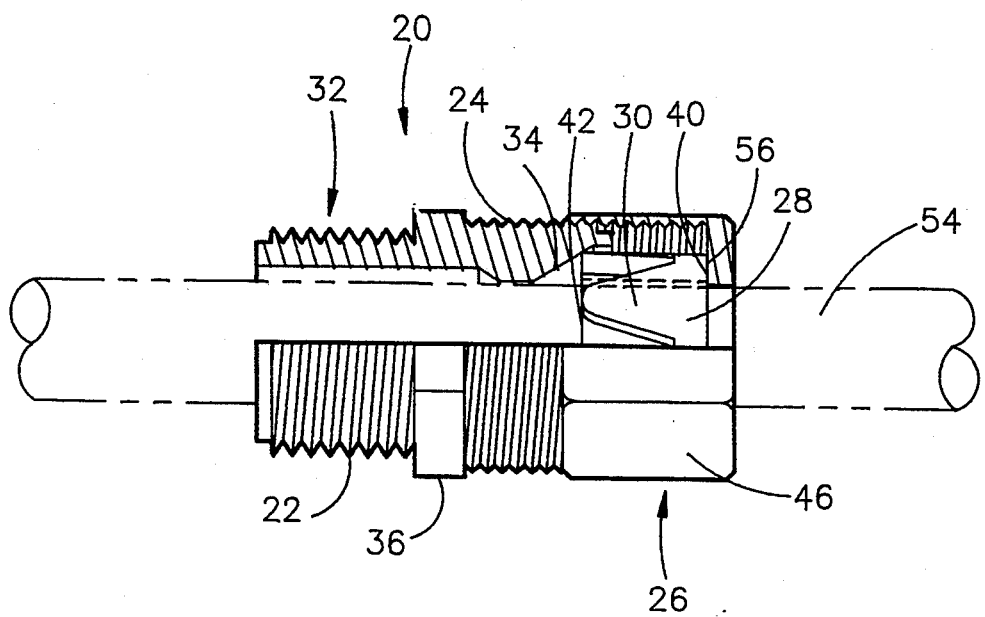
FIG. 1 is a cross-section of the assembled unit with a portion broken away to show the grommet and the cable in phantom lines.

A cross-sectional view of the assembled low profile strain relief cord grip 20 is shown in FIG. 1. An inserted cable 54 is shown in phantom lines inserted through the assembly.

When installing the low profile strain relief cord grip 20, the connector 32 may have grommet 28 inserted in the position shown in the cut-away section and compression nut 26 may be lightly threaded onto the compression threads 24 of the connector 32. In this loosely assembled position, the assembled unit will allow the passage of a circular cable 54. The cable 54 for this particular size cord grip may be in the range of 0.200 to 0.472 inches in outer diameter. The connector 32 will typically be affixed to the wall of a junction box or panel at this point by a lock nut that mates with the lock nut thread 22.

After a cable 54 is inserted to the correct depth through the loosely assembled cord grip 20 that has heretofore affixed to a panel, compression nut 26 may be tightened by applying pressure to a wrench or similar tool that contacts opposite chamfered edges or flats 46 of said compression nut 26. Tightening the compression nut 26 eventually causes smooth seat 40 to contact the base surface 56 of grommet 28. Pressure is applied in this manner until the wedge-shaped ribs 30 of the grommet 28 contact the inner conical surface 34 of the connector 32. At this point, continued tightening of the compression nut 26 will cause the wedge-shaped ribs 30 to close toward cable 54. The angle of the conical surface 60° facilitates the proper folding action of the wedge-shaped ribs 30 upon cable 54.

This closing action of the wedge-shaped ribs 30 upon cable 54 is facilitated by the construction of the grommet 28, which is preferably constructed of Sanaprene rubber, a product available from Advanced Elastomer Systems, St. Louis, Mo. 63166 as Sanaprene #201-87-P3AI32-09. The rubber should not be so hard as to not readily conform to the member being gripped. Sanoprene #203-40-PIK071-03 is on the borderline of being too hard. Also, the rubber should not be so soft that there is insufficient gripping of the member. Sanoprene 201-73-P3A045-02 is on the borderline of being too soft. As the wedge-shaped ribs 30 close toward cable 54, the deformation of the ribs also carry the integral continuous portion of the grommet 28, the compressible lip 42, with them toward the cable 54.

The connector and compression nut are preferably Texalon 600-A-ZIP-22, available from Texapol Corporation, 177 Mikron Road, Bethlehem, Pa. 18017.

When fully tightened, compression nut 26 will cause a complete liquid-tight seal around the periphery of cable 54 at the point where the compressible lip 42 contacts it. This seal will be formed for this particular size low profile strain relief cord grip on any diameter cable between 0.200 and 0.472 inches.

Compressible grommet 28 is also designed such that pressure at the contact point between the smooth seat 40 of compression nut 26 and base surface 56 of grommet 28 will not cause deformation along the longitudinal or insertion axis of grommet 28. As the grommet 28 is constructed of Sanaprene, and the compression nut is typically constructed of Texalon, the coefficient of friction between the two surfaces is low and causes slippage to occur between the base surface 56 of grommet 28 and the smooth seat 40 of compression nut 26. Therefore, force applied to the compression nut 26 with a wrench or similar such tool is transmitted to the wedge-shaped ribs 30 causing a deformation of the ribs and compressible lip 42 toward cable 54.

When fully tightened, the grip of the wedge-shaped ribs 30 and compressible lip 42 not only cause a liquid-tight seal, but also hold cable 54 from movement out of the junction box, thereby providing the strain relief characteristics of the invention.

The low profile characteristics of the invention are provided by its small outer dimension, of which in this particular size are typically 1.04 inches across compression nut 26 from edge to edge. This allows the ganging of connectors in holes of a panel theoretically to within 1.05 inches of each other center to center. Two standard 0.75 inch knockouts could therefore be spaced within 0.30 inches edge to edge, allowing the close ganging of the strain relief grip of this invention in applications where space is critical and many connectors must enter one panel, such as in stage lighting applications or wiring machinery.

The grip provided by the wedge-shaped ribs 30 and compressible lip 42 of grommet 28, although forming a strain relief grip, by the nature of the material of construction does not cause abrasion or tearing of the insulation around cable 54. The invention will therefore work with a wide variety of circular, non-metallic conductors.

The liquid tightness of the seal makes the invention ideal for either indoor or outdoor wiring applications. The invention also fills a need in the industry for one fitting that accepts a wide range of cable sizes.

The above description is given to satisfy the requirements for disclosure of the invention and are not to be construed as limiting the scope of the invention insofar as anyone skilled in the art can modify aspects of the invention. For example, the invention may be sized to satisfy a different application than the one cited here, or the material of construction of the components may be other plastic materials with similar characteristics as the material cited in this disclosure. The scope of the invention may be limited only by the appended claims and their equivalents.

What is claimed is:

1. A one-piece compressible grommet for use in a connector having internally inclined surfaces comprising:
   (a) an inner sleeve having an opening therethrough which has a first end and a second end with said first end lying in a transverse plane;
   (b) a plurality of ribs spaced about the periphery of said sleeve and integral therewith having apexes adjacent said second end of said sleeve and having spaces between said apexes; and
   (c) a base for said ribs extending around the entire periphery of said sleeve and integral therewith with a transverse planar end that is coplanar with said first end of said inner sleeve so as to provide an annular smooth end to said grommet to which a compression force can be applied.

2. A strain relief cord grip fitting comprising:
   (a) a connector with an internal grommet seat having one end for attaching to an electric panel and a second end having screw threads thereon;
   (b) a compression nut having screw threads thereon for mating with said screw threads on said second end of said connector and having an internal grommet seat;
   (c) a one-piece grommet of resilient material having a first end and a second end captured between and compressible by said grommet seat on said connector and said grommet seat on said compression nut with at least one of said grommet seats being tapered; and
   (d) said grommet including a cylindrical inner sleeve surrounded circumferentially about the outside with a plurality of wedge shaped ribs integral with said inner sleeve and having apexes adjacent said first end of said grommet, with said apexes located adjacent said tapered seat whereby when said compression nut is screwed on said connector said apexes of said ribs are compressed closer together by said tapered seat both in circumference and diameter and cause said integral inner sleeve to be compressed.

3. A low profile strain relief cable grip comprising:
   (a) a connector having an inboard end, outboard end, and opening therethrough;
   (b) said opening in said connector having an outwardly diverging conical surface therein at said outboard end;
   (c) an attachment arrangement at said inboard end of said connector for attaching said cable grip to an electrical panel;
   (d) compression nut threads at said outboard end of said connector;
   (e) a one piece compressible grommet having an inboard end, an outboard end, and an opening therethrough: a sleeve surrounding said opening with a multiplicity of generally triangular wedges around the periphery of said sleeve and integral therewith at said inboard end of said grommet with each of said wedges having an apex with said wedges located near said inboard end;
   (f) a base for said wedges extending around the entire periphery of said sleeve located at said outboard end of said grommet; and
   (g) a compression nut having an inner seat that mates with said outboard end of said grommet and interior threads that mate with said compression nut threads on said connector.

4. The strain relief cord grip of claim 2 wherein said internal grommet seat of said connector is tapered and said grommet seat on said compression nut is a smooth flat seat.

5. The strain relief cord grip of claim 4 wherein said ribs of said grommet have a base extending around the entire periphery of said sleeve with a transverse planar end that is coplanar with said second end of said grommet so as to provide an annular smooth end to which a compression force can be applied.

* * * * *